United States Patent
Ryu et al.

(10) Patent No.: US 6,887,622 B2
(45) Date of Patent: *May 3, 2005

(54) CARBONACEOUS ACTIVE MATERIAL FOR LITHIUM SECONDARY BATTERY

(75) Inventors: Jae-yul Ryu, Cheonan-si (KR);
Sang-young Yoon, Cheonan-si (KR);
Kyou-yoon Sheem, Cheonan-si (KR);
Sang-jin Kim, Cheonan-si (KR);
Wan-uk Choi, Cheonan-si (KR)

(73) Assignee: Samsung Display Devices Co., Ltd. (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/363,578

(22) Filed: Jul. 29, 1999

(65) Prior Publication Data

US 2002/0006551 A1 Jan. 17, 2002

(30) Foreign Application Priority Data

Nov. 18, 1998 (KR) .............................................. 98-49390

(51) Int. Cl.[7] ............................. H01M 4/36; H01M 4/60
(52) U.S. Cl. ................................. 429/231.8; 429/231.9; 429/231.95; 23/314; 313/354; 252/502
(58) Field of Search ................................. 429/231.8, 231.9, 429/231.95, 212, 248, 217; 23/314; 313/354; 252/502

(56) References Cited

U.S. PATENT DOCUMENTS

| | | | | |
|---|---|---|---|---|
| 5,244,757 A | * | 9/1993 | Takami | 429/194 |
| 5,451,477 A | * | 9/1995 | Omaru | 429/218 |
| 5,561,005 A | * | 10/1996 | Omaru | 429/197 |
| 5,908,715 A | * | 6/1999 | Liu | 429/217 |
| 6,027,833 A | * | 2/2000 | Ueda et al. | 429/218.1 |
| 6,103,423 A | * | 8/2000 | Itoh et al. | 429/231.8 |

FOREIGN PATENT DOCUMENTS

EP 0782207 A1 7/1997

OTHER PUBLICATIONS

Sax, N.I.; Lewis, Sr., R.J. "Hawley's Condensed Chemical Dictionary," Van Nostrand, New York, 1987. p. 298.*
Kuribayashi et al. "Battery Characteristics with Various Carbonaceous Materials" (1995) Elsevier 54, pp. 1–5.*

* cited by examiner

Primary Examiner—Mark Ruthkosky
(74) Attorney, Agent, or Firm—Blakely Sokoloff Taylor & Zafman

(57) ABSTRACT

Disclosed is carbonaceous active material for a lithium-ion secondary battery. Conducting a differential thermal analysis on the carbonaceous active material results in the displaying of at least two exothermic peaks overlapping to form shoulders.

5 Claims, 1 Drawing Sheet

CARBONACEOUS ACTIVE MATERIAL FOR LITHIUM SECONDARY BATTERY

CROSS REFERENCE TO RELATED APPLICATION

This application is based on application No. 98-49390 filed in the Korean Industrial Property Office on Nov. 18, 1998, the content of which is incorporated hereinto by reference.

BACKGROUND OF THE INVENTION (a) Field of the Invention

The present invention relates to carbonaceous material for a lithium-ion secondary battery. More particularly, the present invention relates to carbonaceous material for a lithium-ion secondary battery in which at least two exothermic peaks develop during differential thermal analysis of the carbonaceous material, and the generation peaks overlap to realize shoulders.

(b) Description of the Related Art

There are two basic types of carbonaceous material used in lithium-ion secondary batteries: crystalline graphite and amorphous carbon. Crystalline graphite offers the advantages of exceptional voltage flatness and high charge/discharge efficiency, but a charge/discharge efficiency decreases as a result of side reactions if many of the edges of the hexagonal crystalline graphite are exposed to electrolyte. With regard to amorphous carbon, although this material displays a high discharge capacity, it has a high irreversible capacity, low charge/discharge efficiency, and does not display a high level of voltage flatness.

There have been attempts at producing carbonaceous material using both crystalline graphite and amorphous carbon together to obtain the advantages of both these materials. However, the resulting carbonaceous material displays not only the advantages of crystalline graphite and amorphous carbon, but also all their disadvantages.

SUMMARY OF THE INVENTION

It is an object of the present invention to provide carbonaceous material for a lithium secondary battery in which drawbacks of crystalline graphite and amorphous carbon are minimized, while advantages of these materials are optimized such that the carbonaceous material displays exceptional characteristics of voltage flatness, initial charge/discharge efficiency, and cycle life, in addition to high charge/discharge characteristics.

To achieve the above object, the present invention provides carbonaceous material for a lithium-ion secondary battery in which at least two exothermic peaks develop during differential thermal analysis of the carbonaceous material, and the exothermic peaks overlap to realize shoulders. A difference in temperature between the at least two exothermic peaks is less than 200° C.

BRIEF DESCRIPTION OF THE DRAWINGS

The accompanying drawing, which is incorporated in and constitutes a part of the specification, illustrates examples of the invention, and, together with the description, serves to explain the principles of the invention.

DETAILED DESCRIPTION OF THE INVENTION

Figure 1:
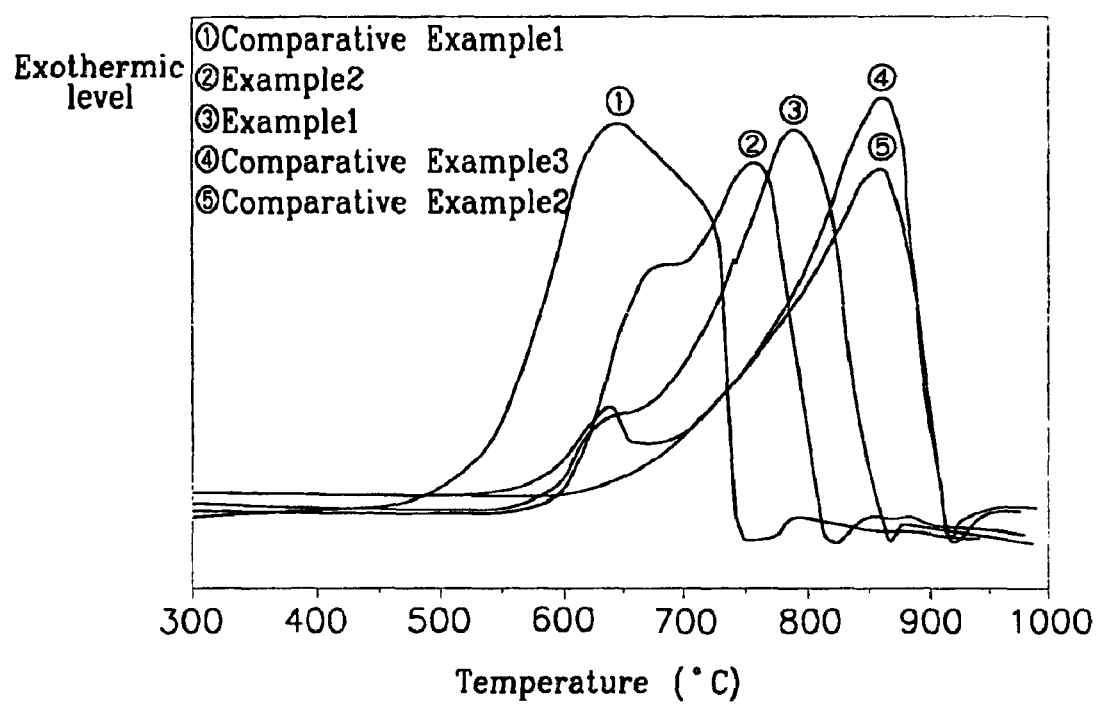
FIG. 1 is a graph of differential thermal analysis results of examples according to the present invention and comparative examples.

The present invention provides carbonaceous material for a lithium-ion secondary battery in which at least two exothermic peaks develop during differential thermal analysis of the carbonaceous material, and the exothermic peaks overlap to realize shoulders.

If a differential thermal analysis is performed on crystalline graphite, a single exothermic peak generally occurs at 800° C., while a single exothermic peak occurs at 700° C. for amorphous carbon. Compared to this, a differential thermal analysis performed on carbonaceous material according to the present invention produces significantly different results: two or more exothermic peaks that overlap to form shoulders. This indicates the realization of the advantages of both crystalline graphite and amorphous carbon, while minimizing the drawbacks of these materials. It is preferable that the two or more exothermic peaks forming shoulders occur at between 500 and 1000° C., and a difference between the exothermic peaks is less than 200° C.

The carbonaceous material of the present invention displaying the above characteristics can be produced by a method of improving a surface of natural graphite or artificial graphite, or by a method of combining natural graphite or artificial graphite with amorphous carbon. The method of improving the surface of natural graphite or artificial graphite will first be described.

The method of improving the surface of natural graphite or artificial graphite begins by dissolving an amorphous carbon precursor such as phenol resin in an organic solvent to produce a solution. Next, crystalline graphite particles are mixed in the solution such that the amorphous carbon precursor is coated on a surface of the crystalline graphite. The resulting solution is refluxed and filtered to obtain a powder. The powder is heat-treated at approximately 1000° C. to obtain an active material. The result is carbonaceous active material having a crystalline graphite core evenly coated by an amorphous carbon shell.

In the method of producing the carbonaceous material by combining natural graphite or artificial graphite with amorphous carbon, an amorphous carbon precursor is added to an amorphous carbon precursor solution. The state of the amorphous carbon precursor in the resulting solution is dissolution, melting, softening or distribution. Using the amorphous carbon precursor solution, at least one crystalline graphite primary particle is coated and agglomerated into a spherical particle to produce a secondary particle, and the secondary particle is carbonized. Of course it is possible to use other methods to combine crystalline graphite and amorphous carbon.

For the amorphous carbon precursor, it is possible to use coal pitch, petroleum pitch, coal-based oil, or heavy oil, or a polymer resin such as phenol resin, furan resin, or polyamide resin. Preferably, coal pitch or petroleum pitch is used as these materials have a high capacity and a low irreversible capacity. Here, it is more preferable to use for the coal pitch or petroleum pitch, a polymer resin is dissolved in and extracted from toluene, tetrahydrofuran, an oil-based solvent, etc. to obtain a toluene or tetrahydrofuran soluble pitch.

For the solvent in which the amorphous carbon precursor is dissolved, melted, softened or dispersed, it is possible to use either an organic or inorganic solvent. For example, it is possible to use toluene, tetrahydrofuran, benzene, ethanol, methanol, hexane, cyclohexane, water, etc. It is also possible to use a mixture of these materials.

For the crystalline graphite primary particle, it is possible to use a shapeless or a disk-shaped crystalline graphite particle. It is also possible to use a disk-shaped, flake, spherical or fibrous graphite particle either singularly or by mixing two or more of the graphite particles. It is obviously also possible to use natural graphite or artificial graphite for the crystalline graphite. It is preferable that an average size of the crystalline graphite primary particle is between 0.1 and 50 µm. Further, it is also possible to use crystalline graphite in which a minute amount of a chemical element such as boron is added thereto.

The method of coating and agglomerating at least one crystalline graphite primary particle using the amorphous carbon precursor is performed by mixing and agglomerating a crystalline graphite primary particle using an amorphous carbon precursor solution, or by spray drying or carrying out spray pyrolysis of an amorphous carbon precursor solution on a crystalline carbon primary particle. In the above agglomeration process, it is possible to utilize the method of freeze drying.

The secondary particle is produced by making the same in a spherical shape at approximately the same time the coating and agglomeration processes are performed, and although it is possible to directly use this secondary particle as an active material, it is preferable that the secondary particle first undergoes a carbonization process. The secondary particle made into a spherical shape is carbonized at a temperature of 700–1400° C. to realize at least one crystalline graphite primary particle coated with amorphous carbon. The at least one primary particle coated with the amorphous carbon is agglomerated to produce an active material of spherical particles. To select particles of a predetermined size either before or after the carbonization process, it is possible to perform a distribution process.

In a differential thermal analysis conducted on the active material produced using the above methods, it was shown that while an exothermic peak ($P_{carbon}$) of the amorphous carbon did not undergo a large change, an exothermic peak ($P_{graphite}$) of the crystalline graphite changed to a temperature level lower than the 800° C. level at which the exothermic peak of crystalline graphite normally occurs. The exothermic peak ($P_{carbon}$) of the amorphous carbon and the exothermic peak ($P_{graphite}$) of the crystalline graphite are not separated, but overlap to form shoulders. Accordingly, a difference in temperatures between the exothermic peak ($P_{carbon}$) of the amorphous carbon and the exothermic peak ($P_{graphite}$) of the crystalline graphite are reduced to approximately 200° C., preferably 100° C.

In particular, more preferable characteristics of the active material are displayed when the above exothermic peaks are in a range of 550–900° C., and a peak intensity ratio $P_{carbon}/P_{graphite}$ between the exothermic peaks of the amorphous carbon and the crystalline graphite is 1 and under. If the peak intensity ratio $P_{carbon}/P_{graphite}$ exceeds 1, this indicates that there is a large amount of the amorphous carbon which results in a reduction in charge/discharge efficiency and in other battery characteristics. However, if boron is added to the crystalline graphite portion of the inventive active material, the exothermic peak of the crystalline graphite occurs at a level over 900° C., or, more precisely, at a temperature of approximately 960° C. It is common to add boron to the crystalline graphite when producing the same since doing so enables a reduction in a graphitization temperature.

As described above, by either coating the surface of crystalline graphite with amorphous carbon, or combining crystalline graphite and amorphous carbon through the processes of mixing and agglomeration, the surface of the amorphous carbon is affected by the crystalline graphite during carbonization such that crystallization is increased. As a result, the drawbacks of the amorphous carbon are minimized, and by the covering of the surface of the amorphous carbon by the crystalline graphite, the drawbacks of the crystalline graphite are also minimized.

A description of manufacturing a lithium-ion secondary battery using the carbonaceous active material of the present invention will be omitted herein as the processes involved are well known to those skilled in the art to which the present invention pertains.

The present invention is further explained in more detail with reference to the following examples. The invention can be utilized in various ways and is not intended to be confined to the examples.

EXAMPLE 1

Coal pitch was processed using tetrahydrofuran to remove insoluble components from the coal pitch, thereby producing tetrahydrofuran soluble pitch. Next, the coal pitch was dissolved in the tetrahydrofuran to produce a solution (30% solid powder) such that an amorphous carbon precursor solution was prepared.

Following the above, 300 g of disk-shaped artificial graphite having a particle diameter of approximately 5 µm was placed in a powder agglomerator and dried by the hot-air. After drying the disk-shaped artificial graphite, 500 g of the prepared amorphous carbon precursor solution was atomized on the disk-shaped artificial graphite powder at a rate of 13 g/min using a double-barrel nozzle. At this time, a weight ratio between the disk-shaped artificial graphite and the amorphous carbon precursor was 5:2.

Following the above, a circular plate of the powder agglomerator was rotated at 500 rpm such that the disk-shaped artificial graphite particles, which were coated with the amorphous carbon precursor, rolled on the circular plate. As a result, after a plurality of the particles gathered and connected, the gathered particles were made into a spherical shape such that secondary particles were formed. After the secondary particles were dried, the secondary particles were heat-treated for 2 hours at 1000° C. to produce carbonaceous active material.

EXAMPLE 2

20 g of phenol resin, which is an amorphous carbon precursor, was dissolved in tetrahydrofuran, which is an organic solvent, to produce a solution having a 20% concentration. Next, 100 g of a natural graphite powder was mixed in the solution. After reflux-reacting the resulting solution, the same was filtered to obtain a powder carbonaceous active material precursor. The carbonaceous active material precursor was heat-treated for 2 hours to produce an active material.

COMPARATIVE EXAMPLE 1

Toluene soluble pitch was carbonized at 1000° C. to produce carbonaceous active material.

COMPARATIVE EXAMPLE 2

Disk-shaped natural graphite of 90% by weight and the active material of Comparative Example 1 of 10% by weight underwent simple mixing to produce carbonaceous active material.

COMPARATIVE EXAMPLE 3

Disk-shaped natural graphite was used as the carbonaceous active material.

A differential thermal analysis was conducted (using a differential thermal analyzer from TA Instrument, Co.) on the various active materials manufactured according to Examples 1 and 2, and Comparative Examples 1, 2 and 3. The differential thermal analysis was performed in a normal air atmosphere and in a state where the temperature was increased from room temperature to 1000° C. at a rate of 10° C./min. Results of the analysis are shown in FIG. 1.

As shown in FIG. 1, the active material of Comparative Example 1 has an exothermic peak at a temperature of 600–700° C., and the active material of Comparative Example 3 has an exothermic peak at a temperature of 800–900° C. The amorphous carbon of the active material of Comparative Example 2 has an exothermic peak at 600–700° C., while the crystalline graphite of the active material of Comparative Example 2 has an exothermic peak at 800–900° C. Although the active material of Comparative Example 2 has these two distinct peaks, no shoulders are formed. Further, with the active material of Comparative Example 2, there is no significant difference in the temperatures at which the exothermic peaks of the amorphous carbon and the crystalline graphite occur compared to where they normally occur for these materials when used separately as active material.

On the other hand, with the active material of Example 1 and Example 2, although an exothermic peak of the amorphous carbon does not occur at a significantly different temperature than at where the exothermic peak for this material normally occurs, an exothermic peak of the crystalline graphite occurs at a far lower temperature of approximately 100° C. than normal for this material. The occurrence of the exothermic peak of the amorphous carbon at a temperature slightly higher than normal is a result of a portion of the amorphous carbon undergoing graphitization. With regard to the exothermic peak of the crystalline graphite occurring at a temperature approximately 100° C. lower than normal, this is a result of the amorphous carbon and the crystalline graphite being formed in single particles, rather than undergoing simple mixing. Accordingly, thermal transmission to the crystalline graphite is realized smoothly.

Shown below in Table 1 are various characteristics of batteries manufactured using (a) the active materials of Examples 1 and 2, and Comparative Examples 1–3 as a negative electrode; (b) lithium transition metal oxide material as a positive material; and (c) a nonaqueous organic electrolyte.

TABLE 1

|  | Reversible Capacity (mAh/g) | Irreversible Capacity (mAh/g) | Charge/ Discharge efficiency (%) | High Rate Capacity (mAh/g) | Battery Life (100 cycles) |
|---|---|---|---|---|---|
| Example 1 | 354 | 39 | 90 | 350 | 80% |
| Example 2 | 362 | 38 | 91 | 350 | 77% |
| Comparative Example 1 | 261 | 84 | 76 | 241 | 72% |
| Comparative Example 2 | 327 | 75 | 81 | 249 | 63% |
| Comparative Example 3 | 335 | 70 | 83 | 265 | 58% |

As shown in Table 1 above, the batteries manufactured using the active material of Examples 1 and 2 display characteristics that are superior to the batteries manufactured using the active material of Comparative Examples 1, 2 and 3. That is, the reversible capacities are larger, the irreversible capacities are smaller, and the charge/discharge efficiencies, the high rate capacities and battery lives are substantially improved.

By the occurrence of two or more peaks in thermal differential analysis in which the peaks overlap to form shoulders, the active material of the present invention minimizes the drawbacks of crystalline graphite and amorphous carbon, while maximizing the advantages of these materials, thereby enabling the manufacture of batteries having superior electrochemical characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A carbonaceous active material comprising:

at least one crystalline graphite core; and an amorphous graphitizable carbon shell coating the outside of the crystalline graphite core wherein a differential thermal analysis conducted on the carbonaceous active material in 10° C. increments per minute starting from room temperature and proceeding to 1000° C. at atmospheric pressure results in the displaying of at least two exothermic peaks overlapping to form shoulders, the amorphous graphitizable carbon shell coating is derived from an amorphous carbon precursor selected from the group consisting of pitch, coal based oil and heavy oil, and wherein the active material includes at least one crystalline graphite primary particle coated with amorphous carbon, and the at least one crystalline graphite primary particle coated with the amorphous carbon is agglomerated and made into a spherical shape to produce secondary particles.

2. The carbonaceous material of claim 1 wherein the at least two exothermic peaks occur at a temperature of 500–1000° C.

3. The carbonaceous material of claim 1 wherein the at least two exothermic peaks occur at a temperature of 500–900° C.

4. The carbonaceous material of claim 1 wherein a difference in temperature between the at least two exothermic peaks is less than 200° C.

5. The carbonaceous material of claim 1 wherein a peak intensity ratio of the active material is 1 or less.

* * * * *